March 8, 1949     M. W. FISH ET AL     2,463,935

THERMAL MOTOR PROTECTOR

Filed July 9, 1945

INVENTORS
Donald F. Alexander
Mortimer W. Fish
BY
Spencer Hardman and Fehr
Attorneys Patented Mar. 8, 1949

2,463,935

UNITED STATES PATENT OFFICE 2,463,935

THERMAL MOTOR PROTECTOR

Mortimer W. Fish, Dayton, and Donald F. Alexander, Oakwood, Ohio, assignors to General Motors Corporation, Dayton, Ohio, a corporation of Delaware Application July 9, 1945, Serial No. 603,796

4 Claims. (Cl. 175—294)

This invention relates to electrical apparatus and more particularly to the protection of electrical devices and motors.

To obtain the maximum output of an electric motor it is necessary to load it until the motor operates at the maximum temperature which can be safely withstood by the insulation of the windings. However, to prevent damage to the motor some form of control must be provided to disconnect the motor from the power source to prevent further heating whenever the temperature of the insulation approaches the maximum safe temperature thereof. Thermal switches mounted upon the motor housing have been used but these are expensive and are relatively slow to respond to the actual temperature of the insulation, since such thermal switches cannot readily be placed in direct contact with the insulation.

It is an object of our invention to provide means which, without the addition of any switches in the motor circuit, will protect the motor when the windings approach the maximum safe temperature limit.

It is another object of our invention to provide a temperature responsive resistance having a negative temperature coefficient of resistance in heat exchange relation with the motor and to use this resistance to control the opening of the usual motor protector.

It is another object of our invention to provide a temperature responsive resistance to control the flow of current through an actuating element of an overload protector to cause operation of the protector when the resistance reaches a predetermined temperature.

Further objects and advantages of the present invention will be apparent from the following description, reference being had to the accompanying drawings, wherein a preferred form of the present invention is clearly shown.

Figure 1:
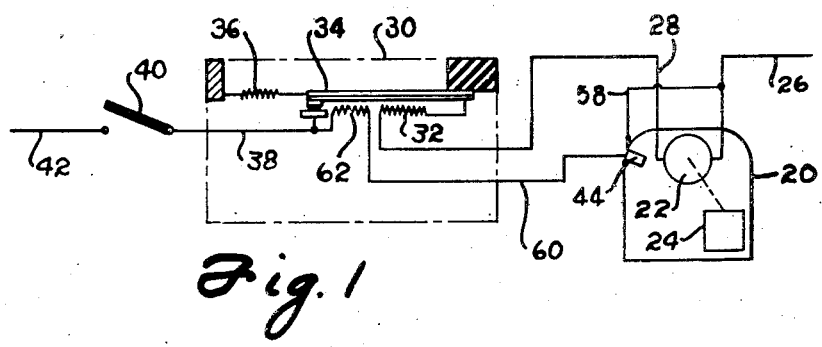
Fig. 1 is a wiring diagram of an electric motor circuit embodying one form of our invention.

Referring now more particularly to Fig. 1, there is shown a sealed motor-compressor unit 20 containing an electric motor 22 and a compressor 24 directly driven by the electric motor 22. The electric motor 22 is connected directly to the supply conductor 26 and connected by the conductor 28 to a thermal overload protector 30. This thermal overload protector 30 includes an electric heating element 32 connected at one end to the conductor 28 and at the other end to the anchored end portion of a cantilever bimetal strip 34. This cantilever strip 34 may be provided with a snap action through the column loading provided by the compression spring 36. The bimetal strip 34 carries a movable contact at its end which is normally in engagement with the stationary contact connected to the conductor 38. This conductor 38 connects to a control switch 40 which may be a thermostat switch or any other type of control switch. This switch 40 is connected by the conductor 42 to the source of power.

Figure 2:
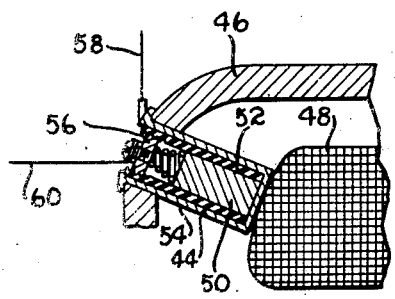
Fig. 2 is an enlarged sectional view of a portion of the motor shown in Fig. 1.

The portion of the overload protector 30 just described constitutes one form of a conventional thermal overload protector. Such a protector will trip rapidly to protect the motor insulation under heavy overload. It is however, difficult to set such an overload so that it will allow the motor to operate substantially up to the maximum safe temperature of its windings and yet disconnect the motor before this maximum safe temperature is reached. To make the protector 30 sensitive to the temperature of the insulation of the windings we provide a metal well 44 (see Fig. 2) in the motor housing 46. This well extends into the sealed unit until the bottom of the well fits tightly against the insulated motor windings 48. Within the metal well 44 we provide a temperature responsive resistance element 50 having an extremely high negative temperature coefficient of resistance.

This element is preferably made of silver sulfide, but other materials having this characteristic, such as a mixture of nickel and manganese oxides or uranium oxide may be used. At 25 degrees centigrade the changes in resistance of silver sulfide, nickel mangaese oxide and uranium oxide are respectively 4.9, 4.2 and 3.0% per degree centigrade change in temperature. Other materials having such characteristics may also be used. The element 50 may be made of a number of disks stacked together or it may be solid.

The thermal resistance element 50 contacts the bottom of the well 44. It is surrounded by a sleeve 52 of an electrical insulating material. Its upper end is contacted by a compression spring 54 supported by a plug 56 threaded into the insulating material 52. This insulating material 52 may be held in the well by forcing a portion of the rim of the well over the end of the sleeve 52. The rim of the well 44 is connected by the conductor 58 to the conductor 26 while the metal plug 56 is connected by the conductor 60 to a second heating element 62 positioned close to the bimetal strip 34. The other end of the heating element 62 is connected to the conductor 38.

By this arrangement, a shunt circuit is provided around the current heater 32 and motor 22. This shunt circuit includes the conductor 58, the well 44, the thermal resistance element 50, the spring 54, the plug 56 and the conductor 60. When the motor operates at normal temperatures only a negligible amount of current will flow through this shunt circuit. However, when heavier motor loads are encountered the temperature of the windings 48 will gradually rise, thus heating the compressor shell. This will cause more current to flow through the heater 32. However, the resistance of the thermal resistance element 50 will drop rapidly with the rise in temperature of the windings 48 so that the heating element 62 will supply gradually increasing amounts of heat. The protector 30 should be so set that when the windings 48 approach the maximum safe temperature limit of the insulation thereof the heater 62 will supply sufficient heat in addition to the heat provided by the heater 32 to cause the bimetal strip 34 to curl upwardly to open the motor circuit. This will permit the motor-compressor unit 20 to cool. The bimetal strip 34 will likewise cool and after a period of time determined by the setting of the spring 36 the overload protector 30 will reclose and again permit operation of the motor-compressor unit 20.

Figure 3:
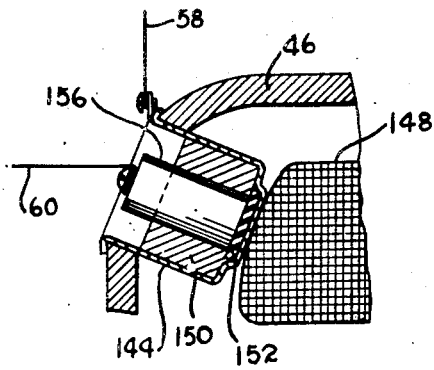
Fig. 3 is a fragmentary section of a motor showing a different arrangement.

In Fig. 3 the modified form of well and thermal resistance element is shown. In this form a large well 144 receives a large ring-shaped thermal resistance element 150. The bottom of the well 144 rests firmly against the motor windings 148. Within the aperture in the thermal resistance element 150 is a metal plug 156 which may be connected to the conductor 60 as in Fig. 2. The well 144 may be connected to the conductor 58. The metal plug 156 is insulated from the bottom of the well 144 by the insulating disk 152. By this arrangement the current flows radially in the resistance element 150 and greater contact surface and greater cross-sectional areas are provided making possible the use of heavier currents through the shunt circuit.

The same materials mentioned in connection with the element 50 may be used for the element 150. These elements may be varied in size and proportions to obtain the desired current flow.

While the form of embodiment of the invention as herein disclosed, constitutes a preferred form, it is to be understood that other forms might be adopted, as may come within the scope of the claims.

What is claimed is as follows:

1. An electric motor circuit adapted to be connected to a power source including an electric motor and a current responsive overload protector connected in series with the electric motor having current responsive means responsive to excessive motor current for disconnecting the motor from the power source, and a second circuit which is in shunt with the motor and said current responsive means and which comprises a thermal resistance element and a current-operated means connected in series with each other for influencing the opening of said overload protector, said thermal resistance element being in heat exchange relationship with said electric motor and having a high negative temperature coefficient of resistance for gradually increasing the energization of said current-operated means in increasing amounts as the motor temperature rises to gradually lower the current value required to open said protector when said motor approaches dangerous temperatures.

2. An electric motor circuit adapted to be connected to a power source including an electric motor and a thermal current responsive overload protector connected in series with the electric motor having a thermal motive element and an electrical current heating means energized in accordance with motor current for heating the thermal motive element for disconnecting the motor from the power source, and a second circuit in shunt with said current heating means and the motor including a thermal resistance element and a second electrical heating means located in heat exchange relation with said thermal motive element, said thermal resistance element being in heat exchange relationship with said electrical motor and having a high negative temperature coefficient of resistance for gradually increasing the energization of said second electrical heating means in increasing amounts as the motor temperature rises to gradually lower the current value required to open said protector when said motor approaches dangerous temperatures.

3. An electric circuit adapted to be connected to a power source including an electric motor and a current responsive overload protector having means responsive to excessive motor current for disconnecting the motor from the power source, and a second electric circuit the current of which varies in accordance with thermal conditions of the motor and which comprises a thermal resistance element and current operated means for influencing the overload protector, said thermal resistance element being in heat exchange relationship with the motor and having a high negative temperature coefficient of resistance for increasing the energization of the current operated means as the motor temperature rises to lower the current value required to actuate the protector for disconnecting the motor from the power source when the motor approaches a detrimental temperature.

4. An electric circuit adapted to be connected to a power source including an electric motor and a current responsive overload protector having means responsive to excessive motor current for disconnecting the motor from the power source, and a second electric circuit for connection with a power source of substantially constant potential, said second circuit comprising a thermal resistance element in heat exchange relationship with the motor for varying the current of said second circuit in accordance with thermal conditions of the motor and current operated means for influencing the overload protector, said thermal resistance element and current operated means being connected in series, and said thermal resistance element having a high negative temperature coefficient of resistance for increasing the energization of the current operated means as the motor temperature rises to lower the current value required to actuate the protector for disconnecting the motor from the first-mentioned power source when the motor approaches a detrimental temperature.

MORTIMER W. FISH.
DONALD F. ALEXANDER.

REFERENCES CITED

The following references are of record in the file of this patent:

UNITED STATES PATENTS

| Number | Name | Date |
|---|---|---|
| 1,210,058 | Fortescue | Dec. 26, 1916 |
| 1,490,990 | Taylor | Apr. 22, 1924 |
| 1,693,379 | Gano | Nov. 27, 1928 |
| 1,974,302 | Finlayson | Sept. 18, 1934 |
| 1,987,725 | Veinott | Jan. 15, 1935 |
| 2,063,981 | Brunner | Dec. 15, 1936 |
| 2,197,115 | Randolph et al. | Apr. 16, 1940 |